July 5, 1960 E. BEREZIN ET AL 2,943,790

ARITHMETIC DEVICE

Filed Jan. 10, 1956 3 Sheets-Sheet 1

ARITHMETIC DEVICE

INVENTORS.
EVELYN BEREZIN
& PHYLLIS HERSH

BY S.C. Yuter

ATTORNEY

INVENTORS.
EVELYN BEREZIN
& PHYLLIS HERSH
BY S.C. Yuter
ATTORNEY.

ARITHMETIC DEVICE

Filed Jan. 10, 1956 3 Sheets-Sheet 3

INVENTORS.
EVELYN BEREZIN
& PHYLLIS HERSH
BY S.C. Yuter
ATTORNEY.

United States Patent Office 2,943,790

Patented July 5, 1960

2,943,790

ARITHMETIC DEVICE

Evelyn Berezin, New York, N.Y., and Phyllis Hersh, West Englewood, N.J., assignors, by mesne assignments, to Curtiss-Wright Corporation, Carlstadt, N.J., a corporation of Delaware Filed Jan. 10, 1956, Ser. No. 558,270

9 Claims. (Cl. 235—170)

This invention relates generally to apparatus that performs arithmetic functions and more particularly to an electronic device that adds or subtracts numbers in the decimal system.

Electronic arithmetic devices have many applications in research and in industry. They accurately perform numerous arithmetic processes in relatively short periods of time to expedite the business of the world by preparing payrolls, checking inventories, and performing other data processing functions, and to promote science by aiding in the solution of complex equations.

The decimal system utilizes the symbols 0, 1, 2, 3, 4, 5, 6, 7, 8, and 9 respectively in the specific order shown.

In counting by units in the decimal system the symbols are written down in their assigned order from the lower limit 0 until the upper limit symbol 9 is reached. The decimal system does not have a single digit symbol that represents 9+1 or ten, therefore the number ten (9+1) is represented by a one (1) immediately to the left of a zero (0) and appears as 10.

Having reached the upper limit of the symbols, the series must be repeated in the assigned order. Thus, when ading 9+1 the 9 is replaced by a 0 and to distinguish the 0 resulting from 9+1 from the symbol 0 representing zero, a 1 is placed immediately to the left of the 0; the resulting symbol now appearing as 10.

Each time that the upper limit 9 is exceeded, the symbol in the left hand column must be increased one unit. The second column to the left indicates the number of times the symbol 9 has been passed and is known as the tens column. The right hand column is known as the units column. The transfer of a unit from the units column to the tens column is known as a carry.

For example, in $$19+1=20$$

the least significant digit of 19 is the 9, the upper limit of the series of decimal digits. There is no single digit symbol having a value that is greater than 9, therefore the symbol series must be repeated, starting with the lower limit (0) of the series of decimal symbols. To indicate a second repeat of the order of symbols, or the passing of the upper limit 9 for the second time, the left or next most significant column of 19 must indicate a unit increase, and the 1 is changed to a 2. The shifting and adding of the unit to the next more significant column is known as "carrying."

In deciphering a decimal number, the number in the extreme right hand column is muliplied by one and the number in the column to the immediate left is multiplied by ten. The number 12 is therefore equal to ten times one plus two which equals twelve. If a third digit were present in a column to the immediate left of the tens column, the third digit would be known as the hundreds digit, it being multiplied by one hundred.

Thus the number two thousand three hundred and fifty seven is represented as $$2357=2(10^3)+3(10^2)+5(10)+7$$
$$=2(1000)+3(100)+5(10)+7$$

Unit subtraction is the process of subtracting the digit one (a unit) from a particular number. During a unit subtraction, it is only necessary to chang the least significant decimal digit of the number to the next smaller decimal digit of the series, for example:

$$15-1=14$$

However, if the least significant figure is the lower limit of the decimal symbol series, the 0 is changed to the upper limit symbol 9, and a unit subtraction is performed on the next most significant digit to reduce it one unit. For example $$30-1=29$$

The shifting of the unit subtraction to the next more significant column is called "borrowing."

Number information is more generally represented in the binary system. However, the binary number system is applicable for utilization by electronic arithmetic devices. The binary number system has only two numbers, one (1) and zero (0). The numbers can be represented by any two conditions such as a voltage and no voltage, an on and an off position of a switch or electronic tube, or the presence or absence of a pulse signal.

The two numbers 0 and 1 of the binary system may be grouped in discrete combinations to represent the numbers of the decimal system.

A number N is represented in the binary arithmetic system by the following formula:

$$N=A_n(2^n)+A_{n-1}(2^{n-1})+\ldots+A_1(2^1)+A_0(2^0)$$

in which the constants $A_n$, $A_{n-1}$, ... $A_{-n}$ are integral coefficients smaller than the number 2; so that the only figures in the binary system are 0 and 1. For example; the number 23 can be written as:

$$23=1(2^4)+0(2^3)+1(2^2)+1(2^1)+1(2^0)$$
$$=16+0+4+2+1$$

and is written as 10111 in the binary system.

The numbers can be written in the usual digital representation as shown for the first ten numbers in Table I.

TABLE I

| Decimal Number | Binary Number |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

By continuing the binary code it will become obvious that there are sixteen possible combinations when using four binary digits. For any number the first binary digit or bit from the right signifies whether there is a $1=2^0$ in the number or not, the second bit place whether there is a $2=2^1$ or not, the third whether there is a $4=2^2$ or not, the fourth whether there is an $8=2^3$ or not, and so on.

A binary-coded decimal number means that each decimal digit of a particular number has been converted into its binary code equivalent.

The rules of addition and subtraction of binary numbers are as follows:

| Addition | Sum | Carry |
|---|---|---|
| 0+0 | 0 | 0 |
| 1+1 | 0 | 1 |
| 0+1 | 1 | 0 |
| 1+0 | 1 | 0 |

| Subtraction | Difference | Borrow |
|---|---|---|
| 0−0 | 0 | 0 |
| 1−1 | 0 | 0 |
| 0−1 | 1 | 1 |
| 1−0 | 1 | 0 |

The presence of a 1 in the carry column indicates that a one must be added to the next most significant column; and the presence of a one in the borrow column indicates that a one must be subtracted from the next most significant column.

It should be noted that in each case of addition or subtraction of any two of the numbers, the resultants are identical; however, the carry and borrow bits may differ.

Generally, binary-coded decimal digits may be added to produce accurate results in binary-coded decimal form.

For example:

```
 16=0001 0110
+ 3      0011
 19=0001 1001
  =  1     9
```

However, by utilizing four binary bits it is possible to represent binary numbers up to sixteen. Decimal digits cover a range of ten from the low limit of 0 to the upper limit of 9. Therefore, whenever a binary sum is greater than 9, a correction must be made to produce an accurate binary-coded decimal digit.

Sums that are greater than 9 but less than 16 may be corrected by adding the correction factor of binary six (0110) to the answer, and introducing a carry into the next most significant digit.

For example:

```
  8          1000
+ 7          0111
             1111
            +0110
       0001  0101
   15=   1     5
```

The sum of the first addition produces a simple binary sum fifteen (1111) only, and the addition of the correction factor of binary six (0110) to the simple binary sum produces a carry (c) and corrects the least significant digit to form a true binary-coded decimal number. Thus, the correction results in the production of a carry into the next most significant digit.

Sums that are greater than 15 may also be corrected by adding the correction factor of binary six (0110) to the answer, however, the production of a carry into the next most significant digit is then produced as a result of the original addition and before the addition of the correction factor.

For example:

```
   9   1001
 + 9   1001
     c 0010
       0110
 18=c  1000
```

where the sum of the first addition produces a simple binary sum (0010) and the required carry (c); the addition of the correction factor of binary six (0110) to the simple binary sum then produces a true binary-coded decimal number.

In the addition of numbers of more than one digit the correction must be applied to each sum digit which is greater than nine or has an associated carry into the following digit.

For example:

```
  3924  0 0011   1001  0010   0100
 +1807  0 0001   1000  0000   0111
        0100 c 0001  0010   1011 simple binary sum
               0110       c 0110 correction
     =  0101   0111  0011   0001 corrected sum
```

Thus, in the addition of binary-coded decimal numbers, the following rules are applicable:

A correction is required when the sum of the two digits has an associated carry bit into the next most significant digit or is greater than nine and therefore has a pulse in the most significant bit and in either or both of the next two least significant bits. The correction involves the addition of binary six (0110) as a correction factor to all digits fulfilling the above conditions.

The simple binary difference of two digits may also require a correction in order to produce the correct decimal difference. The presence of this condition depends on the same conditions which determine the necessity for a correction in addition. The decimal correction required in the subtraction of two binary-coded decimal numbers is similar to the correction used in addition; an interdigit carry must be produced for difference digits which are effectively greater than nine, or which have generated an associated carry (known as borrow in case of subtraction) into the next most significant digit. But, in subtraction, the correction to be added is binary ten; not binary six as is required in addition. This results from the fact that binary six must be subtracted from difference digits greater than nine to reduce them to the proper decimal form. Acting binary ten (1010) produces the same effect when the interdigit carry is blocked.

For example:

```
  1011    1011
 -0110   +1010
  0101    0101
```

Thus, the test for the presence of the correction factor with subtraction is identical to the test for the presence of the correction factor with addition. The correction is, however, the addition of binary ten instead of binary six.

Thus, binary-coded decimal adder-subtractor devices that are presently being used require two separate arithmetic units. The first arithmetic unit is used to add binary six to all sums that require corrections, and the second arithmetic unit is used to add binary ten to all differences that require corrections. The arithmetic units do not cooperate with each other nor operate simultaneously. When one unit is operating, the other is not operating.

It is accordingly an object of the invention to provide an improved arithmetic device.

Another object of the invention is to provide an improved arithmetic device which generates binary-coded decimal numbers.

A further object of the invention is to provide an adder-subtractor device that is reliable yet relatively simple, compact and inexpensive.

Still another object of the invention is to provide an improved arithmetic device that uses a single arithmetic unit to add correction factors to sums and differences of binary-coded decimal numbers.

Briefly, an arithmetic device in accordance with the invention comprises apparatus for adding or subtracting binary numbers, apparatus for testing the sum or difference of the numbers for a number greater than nine, apparatus to generate a carry if the number tested is greater than nine, apparatus to add binary eight and then subtract binary two (on addition) or to add binary two (on subtraction) if the number tested is greater than nine to produce a correct binary-coded decimal result.

A feature of this invention is a relatively simple device that adds binary eight to binary numbers by inverting the pulse signal that appears in the most significant place of each digit.

Other objects, features and advantages of the invention will be readily appreciated as the apparatus becomes better understood by reference to the following detailed description when considered in connection with the accompanying drawings, wherein.

Figures 3A, 3B:
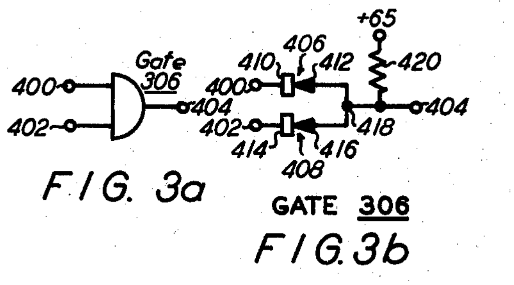
Figs. 3–7 illustrate the symbols and corresponding circuitry of the components shown in Fig. 1.

Fig. 3*a* illustrates the symbol which represents a coincidence ("and") gate.

Fig. 3*b* shows the schematic details of the coincidence gate of Fig. 3*a*.

Figures 4A, 4B:
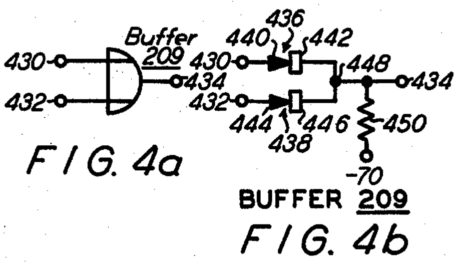

Fig. 4*a* illustrates the symbol which represents a buffer ("or") gate.

Fig. 4*b* shows the schematic details of the buffer gate of Fig. 4*a*.

Figure 5A:
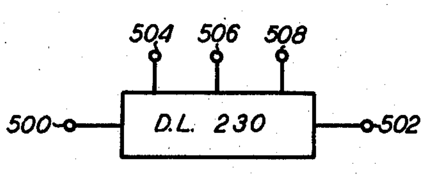

Fig. 5*a* illustrates the symbol which represents a delay line.

Figure 5B:
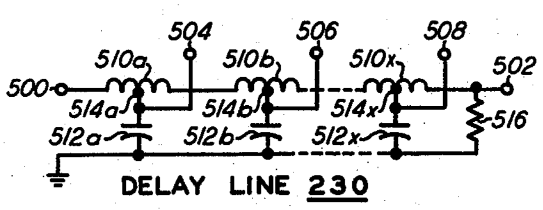

Fig. 5*b* shows the schematic details of the delay line of Fig. 5*a*.

Figure 6A:
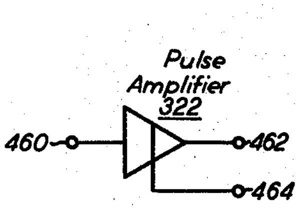

Fig. 6*a* illustrates the symbol which represents a pulse amplifier.

Figure 6B:
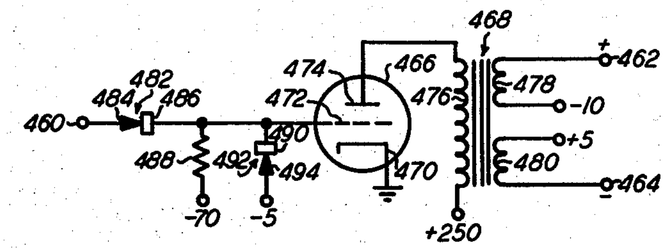

Fig. 6*b* shows the schematic details of the pulse amplifier of Fig. 6*a*.

Figure 7A:
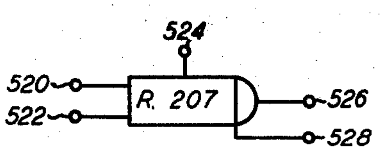

Fig. 7*a* illustrates the symbol which represents a reshaper, and

Figure 7B:
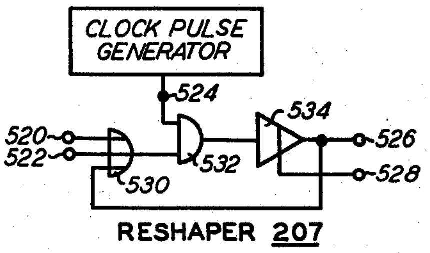

Fig. 7*b* shows the logical details of the reshaper of Fig. 7*a*.

*General description*

In performing arithmetic computations with computing machines, it is possible to use combinations of binary digits to represent decimal digits provided that the aforementioned rules of binary arithmetic are followed. The apparatus performing the operations must test the binary-coded representations for the particular combinations which require exceptions to the normal binary arithmetic operations so that the arithmetic operations can be modified.

Since the presence of a signal can represent a one and the absence of a signal can represent a zero, only two states of the signal need to be considered. A common method of representing the digits of a number is by the discrete time spacing of a plurality of electrical pulses derived from a series of constant frequency square waves. The period of a pulse will hereinafter be called a pulse time. The presence of a pulse at a particular pulse time represents a one and the absence of a pulse during a particular pulse time represents a zero.

As was seen in the aforementioned arithmetic examples, the operations proceeded from right to left; from the least significant binary digit to the most significant binary digit. Therefore, the pulse patterns representing the numbers will always progress, relative to time, from the least significant digit to the most significant digit of a number.

Unless otherwise indicated, when the term digit is hereinafter used in connection with the operations of the apparatus, the term will be understood to mean signals representing the specified digit.

This device comprises two basic functional parts that cooperate with each other to form a binary-coded decimal adder-subtractor. The first, a binary adder-subtractor 90, and the second, a decimal corrector 91. The first part forms a binary sum or difference; the second part produces the required decimal correction.

The decimal corrector 91 comprises a testing and pulse generator 92, a binary eight adder 94, and a binary two adder-subtractor 96.

The testing and pulse generator 92 receives the arithmetic results of the binary adder-subtractor 90, and tests for and generates an interdigit carry or borrow pulse for digits of the resultant that are greater than nine. The binary eight adder 94 is fed by the binary adder-subtractor 90 and controlled by the generated pulse from the testing and pulse generator 92 to modify all digits greater than nine by the addition of binary eight. The binary two adder-subtractor 96 is coupled to receive all generated interdigit carry or borrow pulses and all modified arithmetic results to add binary two (on subtraction) or to subtract binary two (on addition) to or from all modified digits.

To simplify design, to reduce the number of components, and to expedite the operations of this invention, all required interdigit carries are generated and all interdigit carries produced by the addition of the correction are blocked. Thus, each sum or difference is scanned, and if it fulfills certain specific conditions, an interdigit carry is artificially generated and the correction factor is then added. However, all interdigit carries resulting from the addition of the correction factor are blocked. The correction factor of binary six on addition and binary ten on subtraction is effectively added in a single arithmetic unit.

*Detailed description*

In the addition of two binary-coded decimal numbers the augend is inserted or fed into the adder-subtractor 90 through the input terminals AM and —AM, and the addend is fed into the adder-subtractor 90 through the input terminals AS and —AS. If, on the addition or subtraction of two binary-coded decimal numbers, the sum or difference is less than nine, no further corrections are required and the digit appears at the output terminal AN in a correct form. If, however, the resultant sum or difference is greater than nine, a decimal correction must be made to produce an answer in the correct form at the output terminal AN. In addition, the two bits that are to be added together are fed into the information input terminals AS, —AS, AM and —AM of the adder-subtractor 90. If the sum of the two bits is greater than nine, a carry bit is generated. The carry bit is then delayed one pulse time and fed into input terminals AT and —AT of the binary adder-subtractor 90 in time to be added into the sum of the next most significant two bits. In subtraction the process is essentially the same; however, a difference bit and a borrow bit are produced, the latter delayed and sent back as an input to the terminals AT and —AT.

This arithmetic device forms the sum or difference, and carry or borrow, in accordance with the following table:

| Augend or Minuemd AM | Addend or Subtrahend AS | Delayed Carry or Borrow AT | Sum or Difference | Carry on —EX | Borrow on EX |
|---|---|---|---|---|---|
| 0 | 0 | 0 | 0 | 0 | 0 |
| 0 | 1 | 0 | 1 | 0 | 1 |
| 0 | 0 | 1 | 0 | 0 | 1 |
| 0 | 1 | 1 | 0 | 1 | 1 |
| 1 | 0 | 0 | 1 | 0 | 0 |
| 1 | 1 | 0 | 0 | 1 | 0 |
| 1 | 0 | 1 | 0 | 1 | 0 |
| 1 | 1 | 1 | 1 | 1 | 1 |

At each instant that a "1," (a positive potential pulse), appears on the AM, AS, or AT input terminals, a negative potential pulse appears on the —AM, —AS, or —AT input terminals respectively. The polarities are reversed for the representation of a "0."

The sum or difference of two binary-coded decimal numbers appearing at the AM and AS input terminals of the adder-subtractor 90 is formed by the three-input buffers 201, 202, 203 and 204. If any one of the three signals AM, AS and AT (Augend or Minuend, Addend or Subtrahend, and Carry or Borrow) is present, a pulse will pass through the gate 205. If all three input signals are present a pulse will also pass through the gate 205. Thus, if only two of the inputs are present at any particular instant, a pulse will not pass through the gate 205.

The binary carry or borrow is produced by the buffers 209, 210 and 211 which feed the associated gate 212.

When this device is utilized for addition, a signal having a positive polarity is fed from the −EX terminal of the control signal generator 246 to the buffer 210 and the gate 305 and a signal having a negative polarity is fed from the EX terminal of the control signal generator 246 to the buffer 211 and the gate 304.

The gate 212 produces a carry if there is a signal present on the input terminal AM and either of the terminals AS or AT. The presence of pulses on the input terminals AS and AT only produces a carry pulse through the gate 221. Therefore, on addition a carry pulse is produced if there is a pulse appearing on the input terminals AS and AT or the input terminals AM and AS or AT.

In the subtraction of two binary-coded decimal numbers, the polarities on the terminals EX and −EX of the control signal generator 246 are reversed from those potentials present during addition. Thus, during subtraction, the potential appearing at terminal EX is positive and the potential appearing at the terminal −EX is negative. Again, if pulses are present at the input terminals AS and AT; or AS, or AT but not at AM, a borrow pulse is generated.

The gate 212 operates to pass a borrow pulse only when no signal is present at the input terminal AM and a signal is present at either of the input terminals AS and AT. The presence of a signal (a positive potential pulse) at the input terminals AS and AT will produce a borrow (or carry) pulse through the gate 221.

The sum or difference signal is shaped in the reshaper 207 and the carry or borrow pulse is shaped in the reshaper 214. The carry pulse is delayed a single pulse time and appears at the terminal AT in time to be added to the next most significant bits of the input binary-coded decimal numbers.

A decimal correction is required with both addition and subtraction whenever an output digit of the binary adder-subtractor 90 is greater than nine or has an associated carry into the next decimal digit. Furthermore, an interdigit carry must be produced whenever an output digit is greater than nine. Thus the presence of the carry bit is adequate indication of the requirement of a correction.

The test for a number greater than nine is made at the output of the binary adder-subtractor 90 by the testing and pulse generator 92. By means of a timing pulse 4–0/4D that occurs in time with the most significant bit of each sum or difference digit, a test is made for a pulse in the most significant bit and either or both of the two previous or less significant bits. The two other bits are fed to the gate 216 from the one-half and one and one-half pulse time delay taps of the two and three-quarter pulse time delay line 230 through the buffer 228. When a digit is greater than nine a pulse goes through the gate 216 and is reshaped by the carry or borrow reshaper 214. The correction factor depends upon a pulse out of the carry or borrow reshaper 214 and is produced in the following manner: On addition, the correction factor that must be added is binary six, and on subtraction the correction factor that must be added is binary ten. All interdigit carries that result from the addition of binary six or binary ten must be blocked.

Therefore, on addition, binary six (0110) must be added to all binary sums that are greater than nine or have an associated carry into the next most significant digit; and on subtraction, binary ten (1010) must be added to all binary differences that are greater than nine or have an associated carry into the next most significant digit. However, since 6=8−2 and 10=8+2, it can readily be seen that binary eight (1000) can be added to all sums or differences that require corrections, and then binary two (0010) added on subtraction operations or binary two (0010) subtracted on addition operations.

The addition of binary eight (1000) is accomplished by inverting the most significant bit of the digit that requires correction. This addition of binary eight is performed by the buffer 222 and the gate 224 of the binary eight adder 94. If there is a pulse out of the carry or borrow reshaper 214 at the pulse time *t*4–1/4, the positive potential pulse appearing on the positive output terminal of the sum or difference reshaper 207 is blocked and negative potential pulse appearing on the negative output terminal is effectively passed through the gate 224. This method effectively adds binary eight (by inverting the most significant pulse of digits greater than nine) to the sum or difference, without generating carries. Thus it can be seen that binary eight can be added to any binary number (and blocking all carries) by simply inverting the most significant pulse of each digit. If the most significant pulse is a one, it is changed to a zero, and if the most significant pulse is a zero, it is changed to a one.

The addition or subtraction of binary two (0010) is performed after the inversion of the most significant pulse (adding binary eight) in order to complete the correction. The information that is to be corrected is delayed by means of a delay line 230. This delay is necessary to test for binary coded decimal digits that are greater than nine. The information is then fed to a binary two adder-subtractor 96 where the addition or subtraction of binary two (0010) is then performed. The addition or subtraction of binary two is performed at a reshaper 303 and three associated gates 304, 305 and 306. If the information that appears at the output of the reshaper 303 was initially less than ten it is fed directly to an output terminal AN without modification. If, however, the information that appears at the output of the reshaper 303 is partially corrected information of a binary digit that was initially greater than nine, a further correction must be made. A signal (carry or borrow) that appears at the output of the carry or borrow reshaper 214 at the pulse time *t*4–1/4, is passed through the gate 224 by means of a timing pulse 4–1/4D and is then shaped and delayed in the reshaper 227 and the delay line 230 to provide a correction pulse for the addition or subtraction of binary two. The negative and positive output signals from the reshapers 303 and 309 are fed to two buffers 310 and 311. The output signal of the buffer 310 is not positive if there is a positive potential pulse present on the positive output terminals of the two reshapers 303 and 309. The outputs of the buffers 310 and 311 are fed to the input terminals of the gate 312. The gate 312 produces an output pulse only when there is a positive signal from one but not from both of the reshapers 303 and 309. As was noted previously, on addition and subtraction the sum and difference bits are alike but the carry and borrow bits are different. A generated carry or borrow pulse that is gated by the timing pulse 4–0/4D passes through the reshaper 214 and is delayed a single pulse time by the combination of the reshapers 214 and 220, and the delay line 233 to produce the correct carry or borrow for addition to the next pulses. This generated carry or borrow pulse from the delay line 233 is also fed into the gate 306 where it is gated a 1–1/4D timing pulse to indicate the addition or subtraction of binary two.

On subtraction binary two is added. In this case there must be a carry into the next bit only when there is a correction pulse and an information pulse. On subtraction the signal appearing on the EX terminal of the control signal generator 246 has a positive potential and the signal appearing at the —EX terminal has a negative potential. The delayed correction pulse from the reshaper 214 is therefore gated through the gate 304 by the positive signal appearing on the terminal EX and the delayed information pulse to produce an add one into the next most significant bit. In subtraction it is possible to produce a carry out of the most significant pulse of the digit. However this is blocked by the timing pulse —4–1/4D as applied to the gate 304.

During addition, the signals appearing on the EX and —EX terminals respectively have a negative and positive polarity. In addition binary two must be subtracted. There must be a borrow when there is a subtraction pulse and no information pulse. Therefore, the positive signal appearing on the —EX terminal gates the delayed negative output of the information reshaper with the delayed correction pulse. It is not possible to gate a carry out of the most significant bit of a digit on addition. This corrected information is then reshaped.

It should be noted that since information pulses and signals are identifiable by their position and time, precisely timed pulses are required with which to manipulate selected portions of the information. Such pulses are usually referred to as timing and clocking pulses and are conveniently supplied by the timing units of a computer. A suitable timing unit titled, Signal Apparatus can be found in the co-pending application of Albert A. Auerbach, Morse Minkow and Edmund D. Schreiner, Serial No. 471,696, filed November 29, 1954, now Patent No. 2,902,686, granted on September 1, 1959. The reshapers 207, 214, 220, 227, 303, 309 and 316 are electronic cir- which respond to square wave input pulses by transmitting pulses which are similar in shape to the original square wave pulses. During the process of reshaping the input pulse, each pulse is delayed for a quarter of a pulse time. Delay lines 230, 233, 325 and 326 are electrical networks which delay the transmission of received signals for a predetermined time interval or pulse times. The period of time that a signal is delayed is measured in pulse times. Each pulse time of delay provides for the storage of one bit or pulse. A buffer transmits a positive output signal when any one of its associated input terminals is at a positive potential and a gate transmits a positive output signal only if all of its associated input terminals are at a positive potential.

Figure 1:
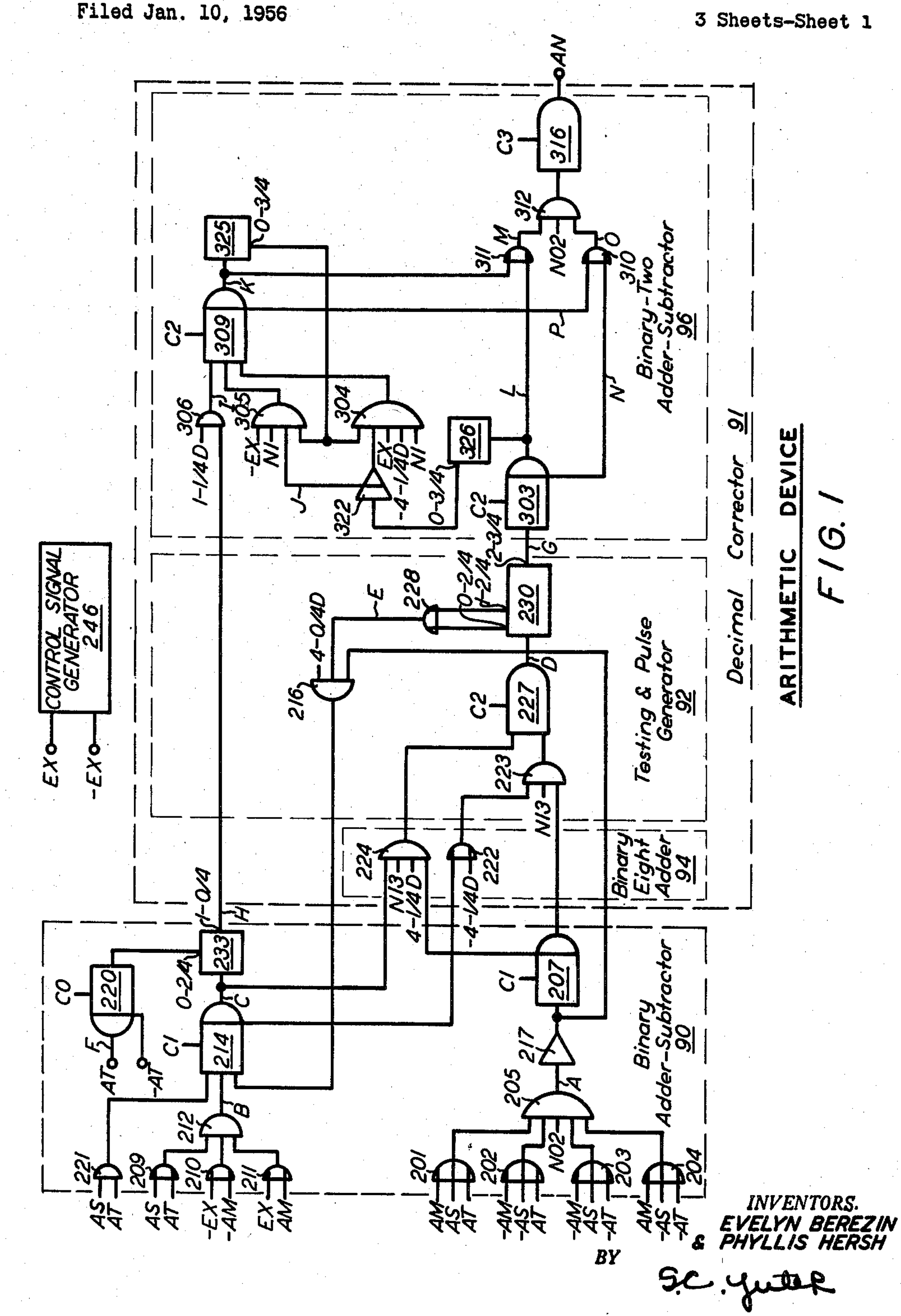
Fig. 1 is a block diagram of the arithmetic device for adding or subtracting binary-coded decimal numbers in accordance with the invention.

Referring to Fig. 1, the output terminals of three buffers 209, 210, and 211 are connected, respectively, to three input terminals of a gate 212. One input terminal of a three input terminal reshaper 214 that passes a pulse C1 is connected to the output terminal of the gate 212; a second input terminal is connected to the output terminal of a gate 221; and a third input terminal is connected to the ouput terminal of a gate 216. Each of the buffers 209, 210 and 211, and the gate 221 has respectively a first and a second input terminal.

The output terminals of four buffers 201, 202, 203 and 204 are connected respectively to four input terminals of a gate 205. A fifth input terminal of the gate 205 is connected to receive a timing pulse N02. Each of the buffers 201, 202, 203 and 204 has respectively first, second and third input terminals.

The input terminal of a pulse amplifier 217 is coupled to the output terminal of the gate 205. The output of the pulse amplifier 217 is fed to the input terminal of a reshaper 207 that passes a pulse C1 and to one of three input terminals of a gate 216 that has three input terminals. A second input terminal of the gate 216 is connected to the output terminal of a buffer 228 and a third input terminal is connected to receive a timing pulse 4–0/4D. As stated previously, the output of the gate 216 is fed to one of the input terminals of the reshaper 214. A gate 223 that has three input terminals is coupled to receive as inputs, the potential appearing on the positive output terminal of the reshaper 207, a timing pulse N13, and the output of a buffer 222. The potential appearing on the negative output terminal of the reshaper 214, and a timing pulse —4–1/4D are fed to the two input terminals of the buffer 222. The potential pulses appearing on the negative output terminal of the reshaper 207, the potential appearing on the positive output terminal of the reshaper 214, and two timing pulses 4–1/4D and N13 are fed into four inputs of a four input terminal gate 224. First and second input terminals of a reshaper 227 are connected to the output terminal of the gate 223 and the gate 224. The reshaper 227 passes the pulse C2. The output terminal of the reshaper 227 is connected to the input terminal of a 2–3/4 pulse delay line 230 that has sampling taps at one-half and one and one-half pulse delay positions.

A first and a second input of the buffer 228 are connected respectively to the one-half and one and one-half pulse delay taps. The positive output terminal of the reshaper 214 is connected to the input terminal of a one pulse delay line 233 having a tap at the one-half pulse delay position. The input terminal of a reshaper 220 that passes a pulse C0 is connected to the one-half pulse delay tap of the delay line 233. The output of the reshaper 220 is the time-delayed carry or borrow. The positive output terminal AT of the reshaper 220 is fed to one input terminal of the gate 221, and to one input terminal of the buffers 209, 202 and 201 respectively. The negative output terminal —AT of the reshaper 220 is fed to one input terminal of the buffers 203 and 204 respectively.

The two and three-quarters pulse delay output terminal of the delay line 230 is connected to the input of an information reshaper 303 that reshapes the input information with a C2 timing pulse. The potential appearing on the positive output terminal of the reshaper 303 is fed to one input terminal of a two input terminal buffer 311, and is also fed to the input terminal of a three-quarter pulse delay line 326. The potential appearing on the negative output terminal of the reshaper 303 is connected to one of two input terminals of a buffer 310. The output terminal of the delay line 326 is connected to the input terminal of a pulse amplifier 322. The potential appearing on the positive output terminal of the pulse amplifier 322 is fed to one of five input terminals of a gate 304, and the potential appearing on the negative output terminal of the pulse amplifier 322 is fed to one of four input terminals of a gate 305. Second and third input terminals of the gate 304 are fed respectively by the timing pulses N1 and —4–1/4D; the fourth input terminal is connected to the EX terminal of the control signal generator 246; and the last input terminal is connected to the output terminal of a three-quarter pulse delay line 325. One input terminal of the gate 305 is connected to the —EX terminal of the control signal generator 246; another input terminal is fed by the timing pulse N1; and the last input terminal is connected to the output terminal of the three-quarter pulse delay line 325. One input terminal of a two input gate 306 is connected to the one pulse delay output terminal of the delay line 233; the other input terminal is connected to receive the timing pulse 1–1/4D. A reshaper 309 has three input terminals which are connected respectively to the output terminals of the gates 304, 305 and 306, and passes the timing pulse C2. The potential appearing on the positive output terminal of the reshaper 309 is fed to one of the input terminals of the buffer 311 and to the input terminal of the three-quarter pulse delay line 325. The output terminal of the delay line 325 is coupled to an input terminal of the gates 304 and 305. The potential appearing on the negative output terminal of the reshaper 309 is fed to an input terminal of the buffer 310. The output terminals of the buffers 310 and 311 are connected to two of the three input terminals of a gate 312. The timing pulse N02 is fed into the third input terminal of the gate 312. The input terminal of a reshaper 316 is connected to the output terminal of the gate 312 and passes the timing pulse C3 to the output terminal AN.

The control signal generator 246 can contain any one of a number of structures such as a flip flop circuit or a battery and a double pole double throw switch to produce potentials having controllable polarities.

To more fully describe the operation of the apparatus, a problem in addition as performed by this device will be described in detail wherein the number 195 will be added to the number 289. The augend (289) is fed into the AM input terminals and the addend (195) is fed into the AS input terminals in the form of binary coded decimal numbers. The least significant bit of the least significant digit of each of the binary coded decimal numbers appears first in time. Thus, it can be said that the binary coded decimal numbers are fed into the arithmetic device "backwards" and, reading left to right, appear to the apparatus as follows:

| | | |
|---|---|---|
| 1001 | 0001 | 0100 |
| 1010 | 1001 | 1000 |

where the top row of pulses are fed into the input terminals AM and —AM in the order shown from left to right. At each instant that a "1" appears in the upper row, a positive potential appears at the AM terminals and a negative potential appears at the —AM terminals. The polarities are reversed in the representation of a "0." The conditions are similar for the second row relative to the AS and —AS terminals.

The carry pulse appears at the output terminals AT and —AT of the reshaper 220. The pulse appearing on the positive output terminal AT of the reshaper 220 is fed into the input buffers 201, 202 and 209 and the gate 221 and appears as a positive potential when a carry or borrow bit is present. The pulse appearing on the negative output terminal —AT of the reshaper 220 is fed into the buffers 203 and 204 and appears as a negative potential when a carry or borrow pulse is present. The carry or borrow bits appear in synchronism with the next most significant pulse.

When performing the arithmetic operation of addition, the control signal generator 246 generates a positive potential on the terminal —EX, and a negative potential on the terminal EX. During subtraction the potential polarities on these terminals are reversed. Therefore, on the addition of the number 195 to the number 289, the terminal EX will be impressed with a negative potential and the terminal —EX will be impressed with a positive potential. Thus, the buffer 210 continuously passes a positive potential or signal. Since, on addition, the potential on the EX terminal is negative, the presence of a positive signal at the output terminal of the buffer 211 is dependent upon the polarity of the signal fed to the AM input terminal.

In this arithmetic device, a positive potential of five volts is utilized to represent a "1" and a negative potential of ten volts is utilized to represent a "0." Referring to the AM and —AM terminals, the presence of a "1" is represented by a positive potential of five volts at the AM (augend or minuend) input terminal, and as a negative potential of minus ten volts at the —AM input terminal. The presence of a "0" is represented by a negative potential of ten volts at the AM input terminal, and a positive potential of five volts at the —AM input terminal. In a like manner, a "1" and a "0" are represented at the AS and —AS (addend or subtrahend) terminals and at the AT and —AT (carry or borrow) terminals.

In the addition of the number 195 to the number 289, the numbers are fed into their respective inputs in binary coded decimal form, the least significant pulse of the least significant digit appearing first in time.

Figure 2:
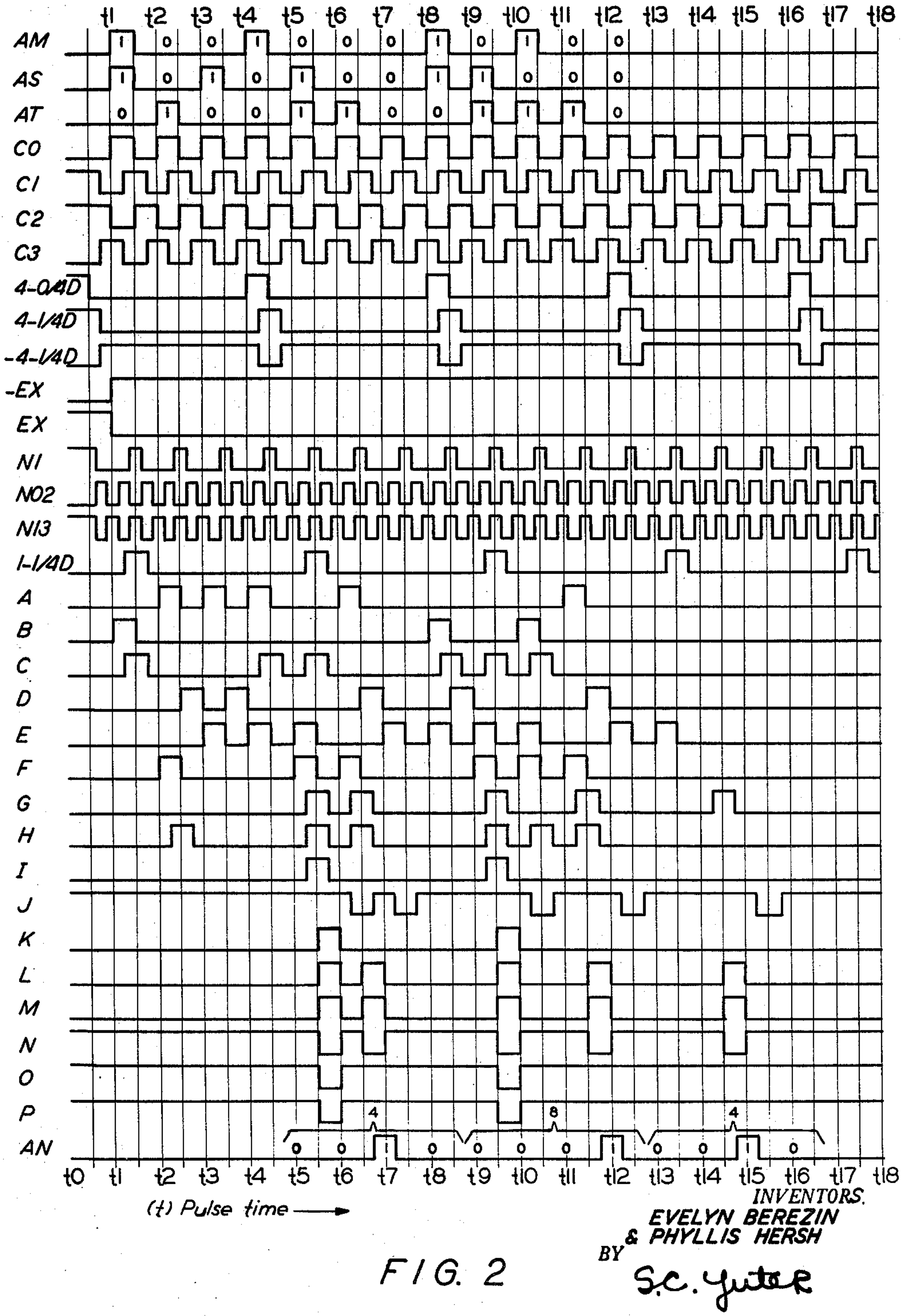
Fig. 2 illustrates representative waveforms associated with the arithmetic device shown in Fig. 1.

Referring to Fig. 2, a graph of the timing pulses C0, C1, C2, C3, 1–1/4D, 4–0/4D, 4–1/4D, N1, N02, and N13 are shown as being plotted against pulse time. The pulse time *t1* indicates the commencement of the time period allotted to the first bit or pulse and *t2* indicates the commencement of the time period allotted to the second bit or pulse. Thus, *t9* indicates the commencement of the time period allotted to the ninth bit or pulse. The timing pulse C0 has a duration of one-half a bit or pulse time and starts at the commencement of each bit or pulse time. The timing pulses C1, C2, and C3 are similar in shape and duration to the timing pulse C0, however, the timing pulse C1 lags timing pulse C0 by one quarter of a pulse time; timing pulse C2 lags timing pulse C1 by one quarter of a pulse time; and timing pulse C3 lags timing pulse C2 by one quarter of a pulse time.

The timing pulse 1–1/4D commences one quarter of a pulse time after *t1*, occurs once every four pulse times, and is one half of a pulse time in duration. The wave shapes of the timing pulses 4–0/4D and 4–1/4D are identical in wave shape and duration to the wave shape of the timing pulse 1–1/4D; however timing pulse 4–0/4D commences at time *t4* and timing pulse 4–1/4D commences one quarter of a pulse time after timing pulse 4–0/4D starts.

Timing pulse N1 is one quarter of a pulse time in duration, and is centered, with respect to time, in the timing pulses C1.

Timing pulse N02 has a duration of one quarter of a pulse time and is centered, with respect to time, in the timing pulses C0, and has a frequency that is double the frequency of the timing pulses C0.

Timing pulse N13 is similar in size, shape and frequency to timing pulse N02, however N13 is centered, with respect to time, in the timing pulses C3.

On addition (Fig. 1), the potential appearing on the —EX terminal of the control signal generator 246 is positive, and the potential appearing on the EX terminal is negative. Therefore a positive potential is fed to the upper input of the buffer 210 and to one of the inputs of the gate 305 as indicated; and a negative potential is fed to the upper input of the buffer 211 and to the gate 304 as indicated. Thus, on addition, the gate 304 becomes inoperative. The terms operative and inoperative will be applied to the operation of gates and buffers with respect to a positive going signal. Thus, a gate or buffer is referred to as operative when it passes positive signals. A gate or buffer is operative or operates when a positive potential pulse that is applied to one of the input terminals appears at the output terminal.

The order of the input signals with respect to pulse time is indicated by the waveforms AM and AS.

At pulse time *t1*, a positive potential signal hereinafter referred to as a pulse is applied to the AM terminal and the AS terminal.

"A" indicates the waveforms appearing at the output of the gate 205.

"B" indicates the waveforms appearing at the output of the gate 212.

"C" indicates the waveforms appearing at the output of the positive output terminal of the reshaper 214.

"D" indicates the waveforms appearing at the positive output terminal of the reshaper 227.

"E" indicates the positive potential pulses appearing at the output of the buffer 228.

"F" indicates the positive potential pulses appearing at the positive terminal of the reshaper 220.

"G" indicates the positive potential pulses appearing at the input to the reshaper 303.

"H" indicates the positive potential pulses appearing at the one pulse delay output of the delay line 233.

"I" indicates the positive potential pulses appearing at the output of the gate 306.

"J" indicates the positive potential pulse appearing at the negative output of the pulse amplifier 322.

"K" indicates the positive potential pulses appearing at the positive output terminal of the reshaper 309.

"L" indicates the positive potential pulse appearing at the positive output terminal of the reshaper 303.

"M" indicates the positive potential pulses appearing at the output of the buffer 311.

"N" indicates the positive potential pulses appearing at the negative output terminal of the reshaper 303.

"O" indicates the positive potential pulses appearing at the output of the buffer 310.

"P" indicates the positive potential pulses appearing at the negative output terminal of the reshaper 309.

AN indicates the binary coded decimal sum of the two inputs as it appears at the terminal AN.

At pulse time *t1*, as indicated by the graphs AM and AS, a pulse is applied to the AM input terminal and to the AS input terminal. The presence of pulses on the AM and AS input terminals; and the absence of a carry pulse from the reshaper 220 makes the buffer 202 inoperative. Thus the gate 205 is inoperative as all of the input terminals are not simultaneously at a positive potential. This is indicated by curve A at time *t1*. However, a pulse is passed by the gate 212 as indicated by the curve B. The gate 221 also operates to pass a pulse. The output pulse from the gates 212 and 221 arrive simultaneously at the input of the reshaper 214 and appear at the positive output terminal as a single positive potential pulse that is delayed one quarter of a pulse time, and indicated by curve C. This one quarter delayed carry pulse is fed to the gate 224 where it is blocked by the absence of the timing pulse 4–1/4D. It is also fed to the delay line 233, where it is delayed one half of a pulse time, and then fed to the reshaper 220 where it is shaped and delayed another one quarter of a pulse time to arrive at the positive output terminal AT of the reshaper 220 at time *t2*, the time of the arrival of the second pulse.

At pulse time *t2*, there is a positive potential pulse at the —AM, —AS and AT input terminals. Therefore gate 205 passes a pulse at time *t2*, and the gate 212 in inoperative. The output of gate 205 is fed through the pulse amplifier 217 to the gate 216 where it is blocked by the absence of a pulse on each of the other two inputs, and it is also fed to the gate 223 after being shaped and delayed one quarter of a pulse time by the reshaper 207. Since there is a positive potential on the negative output terminal of the reshaper 214, and a timing pulse N13 is present, the pulse passes through the gate 223 to the reshaper 227 where it is shaped and delayed. The pulse appears at the output terminal of the reshaper 227 one half of a pulse time after time *t2* as indicated by curve D and is then fed into the delay line 230. From the one half and one and one half pulse delay taps of the delay line 230, this pulse is fed to the input terminals of the gate 216 through the buffer 228 at pulse time *t3* and *t4*. This pulse is also fed to the input terminal of the reshaper 303 at pulse time *t5*–1/4 as indicated by curve G.

At pulse time *t3* there are positive potentials on the AS, —AM and —AT input terminals. The gate 205 operates, and passes a positive pulse as indicated by the curve A. The gate 212 is inoperative. The output of gate 205 is fed through the pulse amplifier 217 to the gate 216 where it is inhibited by the absence of a positive timing pulse 4–0/4D. The output of gate 205 is also fed through the pulse amplifier 217 to the reshaper 207; through the reshaper 207 to the gate 223; and through the gate 223 to the reshaper 227 from which it emerges one half of a pulse time after being fed into the reshaper 207 as indicated by curve D. This pulse is fed to the delay line 230 and is then fed through the one half and one and one half pulse delay taps of the delay line 230, and the buffer 228 to one of the inputs of the gate 216 at the pulse time *t4* and *t5*. This pulse is also fed from the two and three quarter pulse delay output terminal of the delay line 230 to the input terminal of the reshaper 303 at pulse time *t6*–1/2 as indicated by curve D.

At pulse time *t4* there are positive potentials on the input terminals AM, —AS, and —AT. The gate 205 operates to pass a positive potential pulse as indicated by curve A. The gates 212 and 221 are inoperative. The pulse from the gate 205 is fed through the pulse amplifier 217 to the input terminal of the reshaper 207, and an input terminal of the gate 216. As shown by the curves 4–0/4D and E, at time *t4* there is a positive potential pulse on each of the three inputs of the gate 216 and a pulse is allowed to pass through the gate 216 to the reshaper 214. Thus at time *t4* the pulse from the gate 216 is fed to the reshaper 214 where it is shaped and delayed one quarter of a pulse time as indicated by curve C. The output of gate 205 was also fed to the reshaper 207 where it was shaped and appeared at the positive output terminal one quarter of a pulse time later. At the time *t4*–1/4, timing pulse —4–1/4D is negative and there is a negative potential on the negative output terminal of the reshaper 214. Therefore, the buffer 222 is inoperative and the gate 223 is inoperative thus inhibiting the positive potential pulse appearing on the positive output terminal of the reshaper 207. Also, at time *t4*–1/4, the negative output terminal of the reshaper 207 has a negative potential. Thus the gate 224 is inoperative and inhibits the passage of the positive potential pulse from the reshaper 214.

The output of the reshaper 214 is fed to the input terminal of the delay line 233 and then to the reshaper 220 where the pulse appears as a positive potential on the positive output terminal AT as indicated by the curve AT. Thus, it has been shown how, at pulse time *t4*, the gate 216 tested the number for the presence of a pulse in the most significant position and in either or both of the next two least significant positions. The satisfaction of this condition indicates the presence of a number greater than nine and, having found that the number was greater than nine, a carry was generated. The addition of binary eight, the inversion of the pulse occupying the most significant position of the digit is also required for numbers that are greater than nine. This addition is performed by the buffer 222 and the gate 224.

The operation of addition continues with the remaining pulses in an orderly manner similar to that described above and as illustrated by the curves of Fig. 2.

The positive potential output pulses of the delay line 230, for the twelve pulses of input information are illustrated by the curve G. The intradigit carry pulses and the interdigit carry pulses are shown by the curve H.

The subtraction of binary two will now be illustrated. The pulses appearing on the two and three quarter pulse delay output terminal of the delay line 230 are fed to the input terminal of the reshaper 303 where they are shaped and delayed one quarter of a pulse time. The positive potential pulses appearing on the positive output terminal of the reshaper 303 are illustrated by the curve L. Positive potential pulses appearing on the negative output terminal of the reshaper 303 occur when the potential at the positive output terminal is not positive and is illustrated by the curve N.

The positive potential pulses appearing on the positive output terminal of the reshaper 303 are fed to one of the inputs of the two input buffer 311. The positive potential pulses are also fed to the input terminal of a delay line 326 where the pulses are delayed three quarters of a pulse time and then fed to the input terminal of a pulse amplifier 322.

On addition the potential appearing on the EX terminal of the control unit 246 is negative, thus the gate 304 is not operative. The potentials appearing on the negative output terminal of the pulse amplifier 322 are of opposite polarity and delayed three quarters of a pulse time relative the pulses appearing on the positive output terminal of the reshaper 303. This condition is illustrated by the curve J.

At pulse time $t1$–1/4, the timing pulse 1–1/4D is positive, but the potential appearing on the output terminal of the delay line 233 is not positive (as shown by curve H), thus the gate 306 is inoperative.

At the time $t5$–1/4, the timing pulse 1–1/4D is again positive, and the output of the delay line 233 is also positive, thus a positive pulse passes through the gate 306 as illustrated by curve I. The positive output pulse of the gate 306 is fed to the reshaper 309 where it is delayed one quarter of a pulse and reshaped.

The potential appearing on the positive output terminal of the reshaper 309 is represented by the curve K. This positive pulse is first fed to the reshaper 309 where it is shaped and delayed one quarter of a pulse time, and then fed to one of the inputs of the buffer 311. The positive pulse from the reshaper 309 is also fed to the input terminal of the delay line 325 where it is delayed three quarters of a pulse time. The output of the delay line 325 is fed to an input terminal of the gate 305 at pulse time $t6$–1/4. At pulse time $t6$–1/4, the output potential on the negative output terminal of the pulse amplifier 322 is not positive and the gate 305 is inoperative.

At time $t9$–1/4, the timing pulse 1–1/4D is positive, and the output of the delay line 233 is positive. Thus the gate 306 becomes operative and a positive potential pulse is fed from the gate 306 to the reshaper 309 where it is shaped and delayed one quarter of a pulse time. The positive potential pulse present at the output terminal of the gate 306 at pulse time $t9$–1/4 is indicated by curve I; and the positive potential pulse present at the positive potential output terminal of the reshaper 309 at pulse time $t9$–1/2 as illustrated by curve K.

The positive potential appearing on the positive output terminal of the reshaper 309 at pulse time $t9$–1/2 is fed through the delay line 325 to one of the input terminals of the gate 305 at pulse time $t10$–1/4. At pulse time $t10$–1/4, the potential appearing on the negative output terminal of the pulse reshaper 322 is negative, thus the gate 305 is inoperative.

At pulse time $t10$–1/4 the potential appearing on the output terminal of the delay line 233 is positive, however, the gate 306 is inoperative.

The potential appearing on the negative output terminal of the reshaper 309 is opposite in polarity of the potential appearing on the positive output terminal, and is indicated by the curve P.

At each instant that a positive potential pulse appears on one of the input terminals of the buffer 311, a positive potential pulse appears at the output terminal of the buffer. Therefore, by combining the positive potential pulses from the positive output terminal of the reshaper 303, and from the positive output terminal of the reshaper 309, a plurality of positive potential pulses appear at the output terminal of the buffer 311 at pulse times $t5$–1/2, $t6$–1/2, $t9$–1/2, $t11$–1/2, and $t14$–1/2 and is illustrated by curve M.

The positive potential pulses appearing at the output terminal of the buffer 310 is a combination of the positive potential pulses appearing on the negative output terminal of the reshaper 303 and on the negative output terminal of the reshaper 309. Thus, there is a positive potential on the output terminal of the gate 310 at all times except at time $t5$–1/2 and $t9$–1/2. The plot of the positive potential appearing on the output terminal of the buffer 310 is illustrated by curve O.

A positive potential pulse will pass through the gate 312 at each instant that a positive potential pulse appears simultaneously on the input terminals of the buffer 312 as fed from the output terminal of the buffer 310, the output terminal of the buffer 311, and by the timing pulse N02.

Therefore, at pulse times $t6$–1/2, $t11$–1/2, and $t14$–1/2 a positive potential pulse appears at the output terminal of the buffer 312. The positive potential output pulses of the buffer 312 are fed to the input terminal reshaper 316 where they are shaped and delayed one quarter of a pulse time and appear at the output terminal AN at the pulse times $t4$–3/4 through $t16$–3/4.

Thus, the pulses appearing on the output terminal AN appear as follows:

0010 0001 0010=484 wherein the presence of a positive pulse is indicated by a "1."

It should be noted that the first bit of information appears at the output terminal AN 3¾ pulse times after the insertion of the first bit into the arithmetic device.

The addition of negative numbers to positive numbers or to each other may be performed in the same manner as the addition of positive numbers. The digits of negative numbers, however, are complemented with respect to ten before any arithmetic operation is started and a negative sign (a pulse in the sign position) follows the most significant pulse position.

For example, the complement of 9 with respect to 10 is

```
 10
– 9
 ──
  1=0001
```

and is written as

—9=(—)0001

The complement of 4 with respect to 10 is

```
 10
– 4
 ──
  6=0110
```

and is written as

—4=(—)0110

Positive numbers have no pulse in the sign position.

When a negative number and a positive number are added together, or two negative numbers are added together, corrections similar to those used in the addition of two positive numbers are required. The necessity for a correction depends on the absolute value of each sum digit as seen by the computer performing the arithmetic operations. That is, any digit having a pulse in the most significant pulse position and in either or both of the next two least significant pulse positions is seen by the computer as a digit that is greater than nine. A carry bit out of the most significant position is added into the sign position.

For example:

```
–6   (–)0100
+3      0011
──   ─────────
–3     –0111
```

where the sum (—)0111 is a simple binary sum that equals the correct decimal sum.

```
+7      0111
–6   (–)0100
──   ─────────
+1   (–)1011
       C 0110
     ─────────
        0001
```

where the sum of the first addition produces a simple binary sum [(—)1011] only, the addition of the correction factor of binary six (0110) to the simple binary sum corrects the least significant digit and produces a carry (C) to cancel the negative sign to form a true binary coded decimal number.

And, in another example:

| | | |
|---|---|---|
| −8 | (−)0010 | |
| −1 | (−)1001 | |
| −9 | 1011 | simple binary sum |
| | C 0110 | correction |
| | (−)0001 | corrected sum |

A negative number is followed by a negative sign (indicated by a pulse in the sign position and is seen last in time by the computer). Further, a negative number is represented by its complement (with respect to ten). A positive number does not have a pulse in the sign position.

*Description of symbols*

The schematic equivalents of the symbols which are hereinafter employed to simplify the detailed description of the units of the arithmetic device which have been illustrated in block form are shown in Figs. 3–7. For convenient reference, all positive and negative supply buses will generally be identified with a number corresponding with their voltage.

*Gate*

The gates utilized are of the "coincidence" type, each comprising a crystal diode network which receives input signals from a plurality of input terminals and passes the most negative signal.

The symbol of a representative gate 306, having two input terminals 400 and 402, is shown in Fig. 3*a*. Since the signal potential levels are plus five volts (positive signals) and minus ten volts (negative signals), the potentials of the signals which may exist at the input terminals 400 and 402 are thereby limited.

If a potential of minus ten volts is present at one or both of the input terminals 400 and 402, a potential of minus ten volts exists at the output terminal 404. Therefore, if one of the input signals to the input terminals 400 and 402 is positive and the other signal is negative, the negative signal is passed and the positive signal is "blocked."

When there is a coincidence of positive signals at the two input terminals 400 and 402, a positive signal is transmitted from the output terminal 404. In such case, it may be stated that a positive signal is "gated" or "passed" by the gate 306.

The schematic details of the gate 306 are shown in Fig. 3*b*. Gate 306 includes the crystal diodes 406 and 408. Each of the input terminals 400 and 402 is coupled to one of the crystal diodes 406 and 408. Crystal diode 406 comprises the cathode 410 and the anode 412. Crystal diode 408 comprises the anode 416 and the cathode 414. More particularly, the input terminals 400 and 402 are respectively coupled to the cathode 410 of the crystal diode 406 and the cathode 414 of the crystal diode 408. The anode 412 of the crystal diode 406 and the anode 416 of the crystal diode 408 are interconnected at the junction 418. The anodes 412 and 416 are coupled via the resistor 420 and the terminal 422 to the positive voltage bus 65.

If negative potentials are simultaneously present at the input terminals 400 and 402, both of the crystal diodes 406 and 408 conduct, since the positive supply bus 65 tends to make the anodes 412 and 416 more positive. The voltage at the junction 418 will then be minus ten volts since, while conducting, the anodes 412 and 416 of the crystal diodes 406 and 408 assume the potential of the associated cathodes 410 and 414.

When a positive signal is fed only to the input terminal 400, the cathode 410 is raised to a positive five volts potential and is made more positive than the anode 412, so that crystal diode 406 stops conducting. As a result, the potential at the junction 418 remains at the negative ten volts level. In a similar manner, when a positive signal is only present at the input terminal 402, the voltage at the junction 418 will not be changed.

When the signals present at both input terminals 400 and 402 are positive, the anodes 412 and 416 are raised to approximately the same potential as their associated cathodes 410 and 414 and the potential at the junction 418 rises to a positive potential of five volts.

The potential which exists at the junction 418 is transmitted from the gate 306 via the connected output terminal 404.

In the above described manner, the gate 306 is frequently used as a switch to govern the passage of one signal by the presence of one or more signals which control the operation of the gate 306.

It should be understood that the potentials of plus five volts and minus ten volts used for purpose of illustration are approximate, and the exact potentials will be affected in two ways. First, they will be affected by the value of the resistance 420 and its relation to the impedances of the input circuits connected to the input terminals 400 and 402. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 404 to prevent the terminal from becoming more negative than a predetermined voltage level to protect the diodes 406 and 408 against excessive back voltages and to provide the proper voltage levels for succeeding circuits.

*Buffer*

The buffers utilized are also known as "or" gates. Each buffer comprises a crystal diode network which functions to receive input signals via a plurality of input terminals and to pass the most positive signal.

The symbol for a representative buffer 209, having two input terminals 430 and 432, is shown in Fig. 4*a*. Since the signal potential levels in the system are minus ten volts and plus five volts, either one of these potentials may exist at the input terminals 430 and 432.

If a positive potential of five volts exists at one or both of the input terminals 430 or 432, a positive potential of five volts exists at the output terminal 434. If a negative potential of ten volts is present at both of the input terminals 430 and 432, a negative potential of ten volts will be present at the output terminal 434.

The schematic details of the buffer 209 are shown in Fig. 4*b*. The buffer 209 includes the two crystal diodes 436 and 438. The crystal diode 436 comprises the anode 440 and the cathode 442. Crystal diode 438 comprises the anode 444 and the cathode 446. The anode 440 of the crystal diode 436 is coupled to the input terminal 430. The anode 444 of the crystal diode 438 is coupled to the input terminal 432. The cathodes 442 and 446 of the crystal diodes 436 and 438, respectively, are joined at the junction 448 which is coupled to the output terminal 434, and via the resistor 450 to the negative supply bus 70. The negative supply bus 70 tends to make the cathodes 442 and 446 more negative than the anodes 440 and 444, respectively, causing both crystal diodes 436 and 438 to conduct.

When negative ten volt signals are simultaneously present at input terminals 430 and 432, the crystal diodes 436 and 438 are conductive, and the potential at the cathodes 442 and 446 approaches the magnitude of the potential at the anodes 440 and 444. As a result, a negative potential of ten volts appears at the output terminal 434.

If the potential at one of the input terminals 430 or 432 increases to plus five volts, the potential at the junction 448 approaches the positive five volts level as this voltage is passed through the conducting crystal diode 436 or 438 to which the voltage is applied. The other crystal diode 436 or 438 stops conducting since its anode 440 or 444 becomes more negative than the junction 448. As a result, a positive potential of five volts appears at the output terminal 434.

If positive five volt signals are fed simultaneously to both input terminals 430 and 432, a positive potential of five volts appears at the output terminal 434, since both crystal diodes 436 and 438 will remain conducting. Thus the buffer 209 functions to pass the most positive signal received via the input terminals 430 and 432.

*Delay Line*

The symbol for a representative electrical delay line 230 which is a lumped parameter type delay line and which functions to delay received pulses for discrete periods of time, is shown in Fig. 5*a*.

The delay line 230 comprises the input terminal 500, the output terminal 502, and a plurality of taps 504, 506 and 508. A pulse which is fed via the input terminal 500 to the delay line 230 will be delayed for an increasing number of pulse times before successively appearing at the taps 504, 506 and 508. When the pulse reaches the output terminal 502, the total delay provided by the delay line 230 has been applied. In the text which follows, the specific number of pulse-times delay which is encountered before a pulse travels from the input terminal to a tap of the delay line will be stated.

The delay line 230 shown in Fig. 5*b* comprises a plurality of inductors 510 connected in series, with associated capacitors 512 which couple a point 514 on each inductor 510 to ground. A signal is fed into the delay line 230 at the input terminal 500 and the maximum delay occurs at the output terminal 502. The taps 504, 506 and 508 are each connected to one of the points 514 and provide varied delays. The delay line 230 is terminated by a resistor 516 in order to prevent reflections. Although in the delay line of Fig. 5*b* a tap is shown connected to each of the points 514, it should be understood that in actual practice there are ordinarily several untapped points 514 between successive taps.

*Pulse amplifier*

The symbol for a representative pulse amplifier is shown in Fig. 6*a*. When a positive pulse is fed to the pulse amplifier 322 via the input terminal 460, the pulse amplifier 322 functions to transmit a positive pulse which swings from minus ten to plus five volts from its positive output terminal 462, and a negative pulse which swings from plus five to minus ten volts from its negative output terminal 464. At all other times, the pulse amplifier 322 has a negative potential of ten volts at its positive output terminal 462 and a positive potential of five volts at its negative output terminal 464.

The detailed circuitry of the pulse amplifier 322 is shown in Fig. 6*b*. The pulse amplifier 322 includes the vacuum tube 466, the pulse transformer 468 and associated circuitry. The vacuum tube 466 comprises the cathode 470, the grid 472 and the anode 474. The pulse transformer comprises the primary winding 476 and the secondary windings 478 and 480.

The crystal diode 482 couples the grid 472 of the vacuum tube 466 to the input terminal 460, the anode 484 of the crystal diode 482 being coupled to the input terminal 460, and the cathode 486 being coupled to the grid 472. The negative supply bus 70 is coupled to the grid 472 via the resistor 488 and tends to make the crystal diode 482 conductive. The grid 472 and the cathode 486 of the crystal diode 482 are also coupled to the cathode 490 of the crystal diode 492, whose anode 494 is coupled to the negative supply bus 5. The crystal diode 492 clamps the grid 472 at a potential of minus five volts thus preventing the voltage applied to the grid 472 from becoming more negative than minus five volts.

When a voltage more positive than minus five volts is transmitted to the input terminal 460, the crystal diode 482 conducts and the voltage is applied to the grid 472. Since the crystal diode 492 clamps the grid 472 and the cathode 486 of the crystal diode 482 at minus five volts, any voltage more negative than minus five volts will cause the crystal diode 482 to become nonconductive, and that input voltage will be blocked at the crystal diode 482. Thus, the clamping action of the crystal diode 492 will not affect the circuitry which supplies the input voltage.

The cathode 470 of the vacuum tube 466 is connected to ground potential. The anode 474 of the vacuum tube 466 is coupled by the primary winding 476 of the pulse transformer 468 to the positive supply bus 250. The outer ends of the secondary windings 478 and 480 of the pulse transformer 468 are coupled respectively to the positive output terminal 462 and the negative output terminal 464. The inner ends of the secondary windings 478 and 480 are coupled respectively to the negative supply bus 10 and the positive supply bus 5.

A positive pulse which is fed to the grid 472 of the vacuum tube 466 will be inverted at the primary winding 476 of the pulse transformer 468 which is wound to produce a positive pulse in the secondary winding 478 and a negative pulse in the secondary winding 480. These pulses respectively drive the positive output terminal 462 up to a positive five volts potential and the negative output terminal 464 down to a negative ten volts potential because of the circuit parameters.

When the vacuum tube 466 is nonconducting, the negative ten volts potential is fed through the secondary winding 478 and appears at the positive output terminal 462. At the same time, the positive five volts potential is fed through the secondary winding 480 to the negative output terminal 464. These latter conditions are the normally existing conditions at the output terminals 462 and 464.

*Reshaper*

The reshaper 207 is illustrative of the type used and is an electronic circuit which functions to reshape and retime positive pulses which have become poorly shaped and attenuated.

The symbol for a representative reshaper 207 is illustrated in Fig. 7*a* and comprises one or more input terminals of which the input terminals 520 and 522 are shown, timing terminal 524 which receives reshaping and retiming pulses (also designated clocking or C pulses), positive output terminal 526 and negative output terminal 528.

Except when positive pulses are fed to the input terminals 520 and 522 of the reshaper 207, a negative potential of ten volts is present at the positive output terminal 526 and a positive potential of five volts exists at the negative output terminal 528.

When a pulse is fed to the reshaper 207 via one or both of the input terminals 520 and 522, the pulse is reshaped by a clock pulse (received via the terminal 524), which is timed to delay the reshaped pulse for one-quarter of a pulse time, and is then transmitted from the reshaper 207 via the positive output terminal 526. While the positive pulse is being transmitted from the positive output terminal 526, a negative pulse is transmitted from the negative output terminal 528.

The detailed circuitry of the reshaper 207 is illustrated in Fig. 7*b* in which use is made of logical symbols previously described.

The reshaper 207 comprises the buffer 530, the gate 532 and the pulse amplifier 534 connected in series. A positive pulse which is fed via one or both of the input terminals 520 and 522 of the buffer 530 is passed to the gate 532.

A series of identical clock pulses which are generated in the clock pulse generator, as will later be described in detail, are transmitted to the gate 532 via the clock terminal 524. The clock pulses are equal in magnitude and width to the desired shape and timing of the pulses which are to be reshaped and retained. The clock pulses are timed so that the starting time of each clock pulse coincides approximately with the center of the pulse it is intended to reshape. This is done to assure that the pulse to be reshaped will have reached its maximum amplitude by the time the leading edge of a clock pulse arrives at the gate 532. Since in many cases the pulse to be reshaped is originally produced by a previous reshaper and thus has approximately the same width as a clock pulse, its center point will be one-quarter pulse time later than the leading edge of the clock pulse which previously reshaped it. Hence its leading edge after passing through the new reshaper will be one-quarter pulse time later than before, and on this basis it may be said that a reshaper introduces a one-quarter pulse time delay in the signals passing through it.

When the attenuated positive pulse reaches its full magnitude at the gate 532, the coinciding clock pulse is gated through to the amplifier 534 and is amplified and causes a positive pulse to be transmitted from the positive output terminal 526, and a negative pulse to be transmitted from the negative output terminal 528 at the same time.

The positive output terminal 526 is also coupled to one input of the buffer 530 so that a positive signal which appears at the positive output terminal 526 is regenerative and will continue to exist until the clock pulse terminates at the gate 532. This effectively permits the entire clock pulse to be gated through the gate 532, even though the original pulse has decayed before the end of the clock pulse.

Stated more generally, a clock pulse is passed through the gate 532 from the earliest coincidence of that clock pulse with the full magnitude of the attenuated pulse until the termination of that clock pulse. As a result, a clock pulse is substituted for the attenuated pulse in the system after a delay of one-quarter of a pulse time.

There will now be obvious to those skilled in the art many modifications and variations utilizing the principles set forth and realizing many or all of the objects and advantages of the circuits described but which do not depart essentially from the spirit of the invention.

What is claimed is:

1. An arithmetic device for adding or subtracting a pair of decimally expressed items, each decimal digit of said items being represented by a sequence of four signals in binary relationship, said device comprising a control unit settable to cause addition or subtraction of said items, an add-subtract means receiving said signals and controlled by said unit to provide an output signal representative of the sum or difference of said items as determined by the setting of said unit, said means also providing a tens transfer signal when a signal sequence does not represent the arithmetically correct decimal digit, a converter activated by said tens transfer signal to substitute for the signal representing the most significant binary digit of a sequence, a signal representing the complement of said digit and a second add-subtract means settable by said control unit for an arithmetic state opposite to the state of said first unit and rendered effective by said tens transfer signal to arithmetically combine a signal representing a binary two to each non-arithmetically correct decimal digit sequence of said output signal.

2. An arithmetic device for adding or subtracting a pair of decimally expressed items, each decimal digit of said items being represented by a sequence of four signals in binary relationship, said device comprising a control unit settable to determine addition or subtraction, an add-subtract means sequentially receiving said sequences of signals and controlled by said control unit to provide an output signal representative of the sum or difference of said items, a negative output signal which has, for each binary digit position, a signal representing a binary digit which is the complement of the signal in the same digit position of said output signal, and a tens transfer signal for each digital sequence of said output signal which does not represent an arithmetically correct decimal digit, a converter energized by said tens transfer signal to substitute for the most significant binary digit output signal of each such digital sequence, the corresponding signal of said negative output signal to form a partially corrected output signal, a second add-subtract means receiving said partially corrected output signal, a connection from said control unit to said second add-subtract means to set said second add-subtract means to an arithmetic state opposite to that of said first add-subtract means and means under control of said tens transfer signal to supply a signal in the second least significant position of each such non-arithmetically correct digital sequence to said second add-subtract means for arithmetic combination with said partially corrected output signal.

3. An arithmetic device as set out in claim 2 including a gate in said second add-subtract means and means to apply a cyclic signal to said gate to prevent generation of a tens transfer signal in said second add-subtract means.

4. An arithmetic device as set out in claim 2 including an add gate and a subtract gate alternatively rendered effective by said control unit to generate signals representative of binary transfers between the signals of a sequence and means applying a cyclic signal to said subtraction gate to prevent generation of a signal representing a tens transfer between sequences.

5. An arithmetic device for adding or subtracting a pair of decimally expressed items, each decimal digit of said items being represented by a sequence of four signals having a binary value relationship, said device including a function control device settable to determine addition or subtraction, a binary adder sequentially receiving said sequences of signals representing said items and providing an output signal representing the sum or difference of said items and a negative output signal which has, for each binary digit position, a signal representing a binary digit which is the complement of the signal in the same digit position of said output signal, a carry unit controlled by said control unit and generating signals representing binary transfers between the signals of said sequences, said carry signals being applied as a third input to said binary adder, an output signal sensing means to detect the presence in said output signals of a sequence of signals representing a decimal value greater than nine and effective to energize said carry unit as the most significant binary digit signals of two sequences of said input signals are being received by said binary adder, a converter means responsive to carry signals representing a tens transfer between digital sequences of signals to delete from said output signal the most significant binary digit signal of a sequence representing a decimal value greater than nine and to substitute therefor the corresponding signal in said negative output signal to produce partially corrected sequences in said output signal, and a second add-subtract means set by said control unit in an arithmetic state opposite to that of said carry unit to combine a signal representative of a decimal two with said partially corrected sequence in said output signal to produce a signal having in each sequence signals representing the true decimal digit for that sequence, said second add-subtract means being activated by said carry signal representing a tens transfer between sequences.

6. An arithmetic device as claimed in claim 5 wherein said second add-subtract unit includes a second carry unit and means controlled by said control unit to prevent generation by said second carry unit of signals indicative of a tens transfer between the sequences of said output signal having partially corrected sequences.

7. An arithmetic device as claimed in claim 5 wherein said second add-subtract unit includes two carry control gates, means connected to said control unit to activate one or the other of said gates for generation of additive or subtractive carry-overs respectively, a carry generator receiving signals from said two gates and also receiving said carry signal representing a tens transfer between sequences and cyclically operating means to deactivate one of said gates to prevent generation by said carry generator of a carry signal representing a tens carry between sequences of said output signal having partially corrected sequences.

8. An arithmetic device for generating an output signal representing the sum or difference of two decimally expressed items, each decimal digit of said items being represented by a sequence of four signals in binary relationship, said device comprising a control generator settable to determine whether said output signal shall represent the sum or the difference of said items, a carry signal device generating signals representing carry-overs between signals of said sequences and tens transfers between said sequences, an adder receiving said item signals and said carry-over and tens transfer signals and giving an output signal and a complementary output signal said output signal representing a binary digit when a signal is received on any one or on all three of said inputs and said complementary output signal representing a binary digit when none or any two of said inputs receive signals, a control for said carry signal device, said control being settable by said control generator and receiving said item representing signals and said carry and tens transfer signals to activate said carry signal device when any two signals are received if said control generator is set for addition or, if said control generator is set for subtraction, when signals are received representing a carry and a binary digit in a subtrahend or if either of such signals is received in the absence of a signal representing a binary digit in a minuend, a sensing means to detect the presence in the output signal from said adder of a sequence of signals representing a decimal digit greater than nine and operative when such a group is detected to operate said carry signal device for production of a signal representing a tens transfer, a converter unit operative when a tens transfer signal is applied thereto to substitute in the output signal of said adder, the signal in the most significant binary position of a sequence of said complementary output signal for the corresponding signal in said sequence in said output signal to produce a partially corrected output signal and an add-subtract device activated by said tens transfer signals to combine a signal representing a decimal two with said partially corrected output signal sequence thereby providing a fully corrected output signal.

9. An arithmetic device as set out in claim 8 wherein said add-subtract device includes a pair of carry-over control gates selectively settable by said control generator to an arithmetic state opposite to the state to which said control generator is set and means to apply a cyclic signal to one of said gates to prevent generation of a tens transfer signal between said sequences of signals of said output signal having partially corrected sequences.

References Cited in the file of this patent

UNITED STATES PATENTS

| | | |
|---|---|---|
| 2,609,143 | Stibitz | Sept. 2, 1952 |
| 2,623,115 | Woods-Hill | Dec. 23, 1952 |
| 2,623,171 | Woods-Hill | Dec. 23, 1952 |
| 2,701,095 | Stibitz | Feb. 1, 1955 |
| 2,705,108 | Stone | Mar. 29, 1955 |
| 2,775,402 | Weiss | Dec. 25, 1956 |
| 2,823,855 | Nelson | Feb. 18, 1958 |

FOREIGN PATENTS

| | | |
|---|---|---|
| 678,427 | Great Britain | Sept. 3, 1952 |

OTHER REFERENCES

High Speed Computing Devices, ETA. Inc., McGraw-Hill, 1950.

Arithmetic Operations In Digital Computers, Richards, D. Van Nostrand, 1955.